(12) United States Patent
Kajioka et al.

(10) Patent No.: US 6,448,970 B1
(45) Date of Patent: Sep. 10, 2002

(54) IMAGE GENERATION APPARATUS FOR CAUSING MOVEMENT OF MOVING BODY BASED ON FLOW DATA FOR A FLUID SET ON A COURSE, AND INFORMATION STORAGE MEDIUM

(75) Inventors: Toshihiko Kajioka, Yokohama; Yasuhiro Inagawa, Kawasaki, both of (JP)

(73) Assignee: Namco Ltd., Tokyo (JP)

( * ) Notice: Subject to any disclaimer, the term of this patent is extended or adjusted under 35 U.S.C. 154(b) by 0 days.

(21) Appl. No.: 09/119,051

(22) Filed: Jul. 20, 1998

(30) Foreign Application Priority Data

Jul. 25, 1997 (JP) .............................................. 9-215576

(51) Int. Cl.$^7$ ............................................. G06T 15/70
(52) U.S. Cl. ............................. 345/473; 345/419; 703/9
(58) Field of Search ................................. 345/473, 419, 345/355, 418; 703/8, 9, 12, 10

(56) References Cited

U.S. PATENT DOCUMENTS

| | | | | |
|---|---|---|---|---|
| 5,189,430 A | * | 2/1993 | Yano et al. | 342/457 |
| 5,353,074 A | * | 10/1994 | Jones et al. | 353/122 |
| 5,537,641 A | * | 7/1996 | da vitoria Lobo et al. | 345/419 |
| 5,682,326 A | * | 10/1997 | Klingler et al. | 364/514 |
| 5,682,511 A | * | 10/1997 | Sposato et al. | 395/353 |
| 5,877,777 A | * | 3/1999 | Colwell | 345/473 |
| 5,923,329 A | * | 7/1999 | Beale | 345/418 |
| 6,210,168 B1 | * | 4/2001 | Aiger et al. | 434/262 |

FOREIGN PATENT DOCUMENTS

| | | | |
|---|---|---|---|
| JP | 7-116355 | | 5/1995 |
| JP | 63-46186 | | 2/1998 |
| JP | 3127137 | * | 3/1999 |
| JP | 11066343 | * | 3/1999 |

* cited by examiner

Primary Examiner—Mark Zimmerman
Assistant Examiner—Huedung X. Cao
(74) Attorney, Agent, or Firm—Oliff & Berridge, PLC

(57) ABSTRACT

An image generation apparatus and information storage medium wherein the flow of a fluid over a course influences the behavior of a moving body. The moving body is moved along the course, based on manipulation data, flow data $PS_n$ (position of a point $S_n$), flow velocity $VS_n$, and flow direction $\alpha S_n$, this data being set for the course in an object space. A flow-velocity vector $VECF_n$ at the position of the moving body is obtained by interpolation based on flow data that is set for sample points $S_n$ and position data for the moving body, and the moving body is moved in accordance with this $VECF_n$. The flow velocity $VS_n$ is assumed to be the maximum value through the cross-section of the course and the interpolation is based on this $VS_n$ and the flow velocity at either the left edge $L_n$ or the right edge $R_n$ of the course. The flow velocities at the left edge $L_n$ and right edge $R_n$ of the course are made to be greater than zero. The flow data is set for the sample points $S_n$ in a one-to-one correspondence with course data $PC_n$, $\alpha C_n$, $WL_n$, and $WR_n$.

20 Claims, 11 Drawing Sheets

FIG.5A

COURSE DATA

| BLOCK NUMBER n | POSITION OF $C_n$ | COURSE DIRECTION | WIDTH TO LEFT | WIDTH TO RIGHT |
|---|---|---|---|---|
| 0 | $PC_0$ | $\alpha C_0$ | $WL_0$ | $WR_0$ |
| 1 | $PC_1$ | $\alpha C_1$ | $WL_1$ | $WR_1$ |
| 2 | $PC_2$ | $\alpha C_2$ | $WL_2$ | $WR_2$ |
| ⋮ | ⋮ | ⋮ | ⋮ | ⋮ |

FIG.5B

FLOW DATA

| BLOCK NUMBER n | POSITION OF $S_n$ | FLOW VELOCITY | FLOW DIRECTION |
|---|---|---|---|
| 0 | $PS_0$ | $VS_0$ | $\alpha S_0$ |
| 1 | $PS_1$ | $VS_1$ | $\alpha S_1$ |
| 2 | $PS_2$ | $VS_2$ | $\alpha S_2$ |
| ⋮ | ⋮ | ⋮ | ⋮ |

FIG.5C

LEFT-EDGE DATA

| BLOCK NUMBER n | POSITION OF $L_n$ |
|---|---|
| 0 | $PL_0$ |
| 1 | $PL_1$ |
| 2 | $PL_2$ |
| ⋮ | ⋮ |

FIG.5D

RIGHT-EDGE DATA

| BLOCK NUMBER n | POSITION OF $R_n$ |
|---|---|
| 0 | $PR_0$ |
| 1 | $PR_1$ |
| 2 | $PR_2$ |
| ⋮ | ⋮ |

IMAGE GENERATION APPARATUS FOR CAUSING MOVEMENT OF MOVING BODY BASED ON FLOW DATA FOR A FLUID SET ON A COURSE, AND INFORMATION STORAGE MEDIUM

BACKGROUND OF THE INVENTION

1. Field of the Invention

This invention relates to an image generation apparatus for generating an image as seen from a given viewpoint within an object space, and an information storage medium used therefor.

2. Description of Related Art

An image generation apparatus is known in the art for disposing a plurality of display objects within an object space, which is a virtual three-dimensional space, and generating an image as seen from a given viewpoint within that object space. This is also highly popular for enabling players to experience a virtual reality. In a driving game, which is an example of such an image generation apparatus, a player manipulates a vehicle to cause it to travel over a course within an object space, to enjoy a three-dimensional game.

However, in three-dimensional games up until the present, there has been absolutely no consideration of the effects on a moving body of the flow of a fluid such as water on the course. This means that the behavior of the moving body manipulated by the player is not influenced by the flow of the fluid. It has therefore not been possible to further increase the realism, fascination, and excitement of such a game.

SUMMARY OF THE INVENTION

This invention was devised in order to solve the above technical problem, and has as an objective thereof the provision of an image generation apparatus and an information storage medium that make it possible for the flow of a fluid over a course to influence the behavior of the moving body.

In order to solve the above described technical problems, this invention provides an image generation apparatus for generating an image at a given viewpoint within an object space, the image generation apparatus comprising: means for causing a moving body to move over a course within the object space, based on manipulation data that is input from a manipulation means and flow data for a fluid that is set along the course; and means for generating an image as seen from a given viewpoint within the object space, which is an image comprising an image of the course.

The moving body moves along a course within the object space, based on manipulation data from the manipulation means. In addition, the position and direction of the moving body is determined in accordance with this invention from flow data for a fluid such as water. This makes it possible for the flow of the fluid over the course to influence the behavior of the moving body. As a result, it is possible to represent a moving body such as a boat on the course of a river as it passes down the river, enabling the implementation of a type of three-dimensional game that does not exist in the prior art.

A flow-velocity vector at the position of the moving body may be obtained by interpolation based on flow data that is set for a first array of sample points on the course and position data for the moving body, the moving body being moved in accordance with the thus-obtained flow-velocity vector. In this case, the flow data could be comprised of data such as position of sample points, flow velocity, and flow direction. With this invention, the flow-velocity vector at the position of the moving body is obtained on the basis of the flow data at these sample points and position data for the moving body. During this process, the flow-velocity vector is obtained by interpolation that is either linear or along an M-dimensional curve (such as a quadratic or cubic curve). Since only the first array of sample points requires the provision of flow data, it enables a huge reduction in the storage capacity necessary for holding the flow data and also the work required for inputting the data.

The flow data may comprise a first flow velocity that is the maximum flow velocity within a course cross-section; and interpolation on a left side of a line linking the first array of sample points may be based on the first flow velocity and a second flow velocity at a left edge of the course, whereas interpolation on a right side of the line linking the first array of sample points may be based on the first flow velocity and a third flow velocity at a right edge of the course. This makes it possible to represent the flow of the fluid over a course in a manner that is close to that in the real world. It also tends to simplify the interpolation calculations for obtaining the flow-velocity vector.

The second and third flow velocities may be each greater than zero. This makes it possible to prevent the flow velocity at the left and right edges of the course from becoming too small.

The flow data may be set for the first array of sample points to be in a one-to-one correspondence with course data that is set for a second array of sample points on the course. This makes it possible to read out both the flow data and the course data by a single argument, enabling the design of a simpler data structure and processing.

BRIEF DESCRIPTION OF THE DRAWINGS

FIGS. 5A to 5D are tables illustrating the data structures of course data, flow data, left-edge data, and right-edge data;

DESCRIPTION OF PREFERRED EMBODIMENT

A preferred embodiment of this invention is described below, with reference to the accompanying drawings. Note that the description below concerns an example where this embodiment is applied to a rafting game in which a boat travels down a river. However, it should also be noted that this game is merely an application of this invention, and the present invention is not limited thereto.

Figure 1:
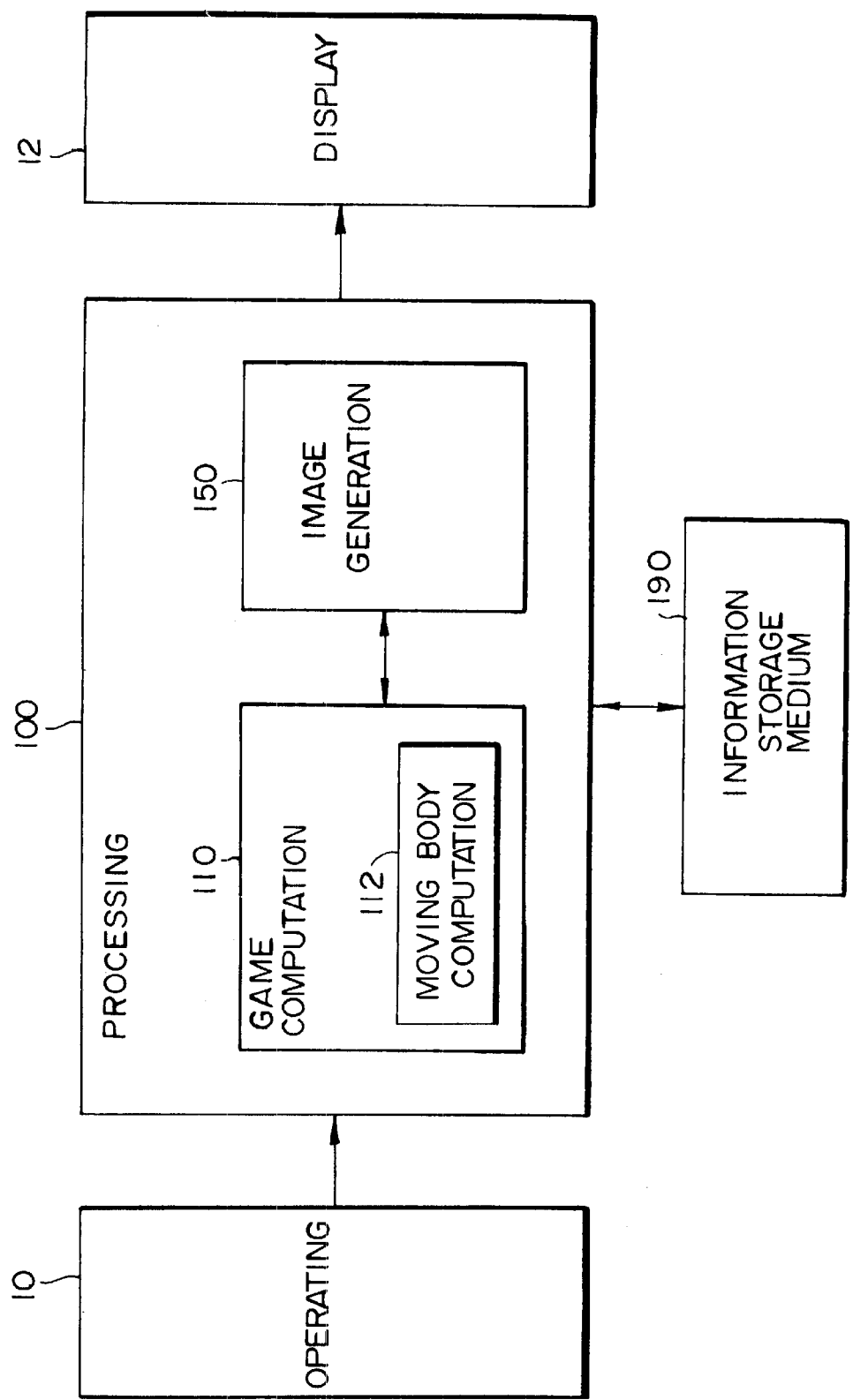
FIG. 1 shows an example of a function block diagram of the image generation apparatus in accordance with an embodiment of this invention.

A function block diagram of an image generation apparatus of this embodiment is shown in FIG. 1, by way of example.

In this case, an operating section 10 allows a player to input manipulation data by using paddles (reference number 252 in FIG. 10), buttons, levers, or the like, and the manipulation data that has been obtained by the operating section 10 is input to a processing section 100.

The processing section 100 performs processing for disposing display objects within an object space and processing for generating an image at a given viewpoint within the object space, based on this manipulation data and a given program. The functions of this processing section 100 could be implemented by hardware such as a CPU (either Complex Instruction Set Computer (CISC) or Reduced Instruction Set Computer (RISC)), a digital signal processor (DSP), an application specific IC (ASIC) (such as a gate array), or memory.

An information storage medium 190 holds programs and data. The functions of this information storage medium 190 could be implemented by hardware such as a CD-ROM, game cassette, IC card, magneto-optical disk, floppy disk, digital video disk (DVD), or ROM. The processing section 100 performs the various processing thereof on the basis of programs and data from this information storage medium 190.

The processing section 100 comprises a game computation section 110 and an image generation section 150. This game computation section 110 performs the various processing required during the game, such as setting the game mode, moving the game forward, determining the position and direction of the moving body, and disposing the display objects within the object space. The image generation section 150 creates an image from a given viewpoint, within the object space as set by the game computation section 110. The image produced by the image generation section 150 is displayed on a display section 12.

This embodiment is characterized in that the moving body is moved along a course within the object space on the basis of manipulation data that is input from the operating section 10 and flow data for a fluid that is set along the course. This processing is done by a moving body computation section 112 within the game computation section 110.

Figure 2A:
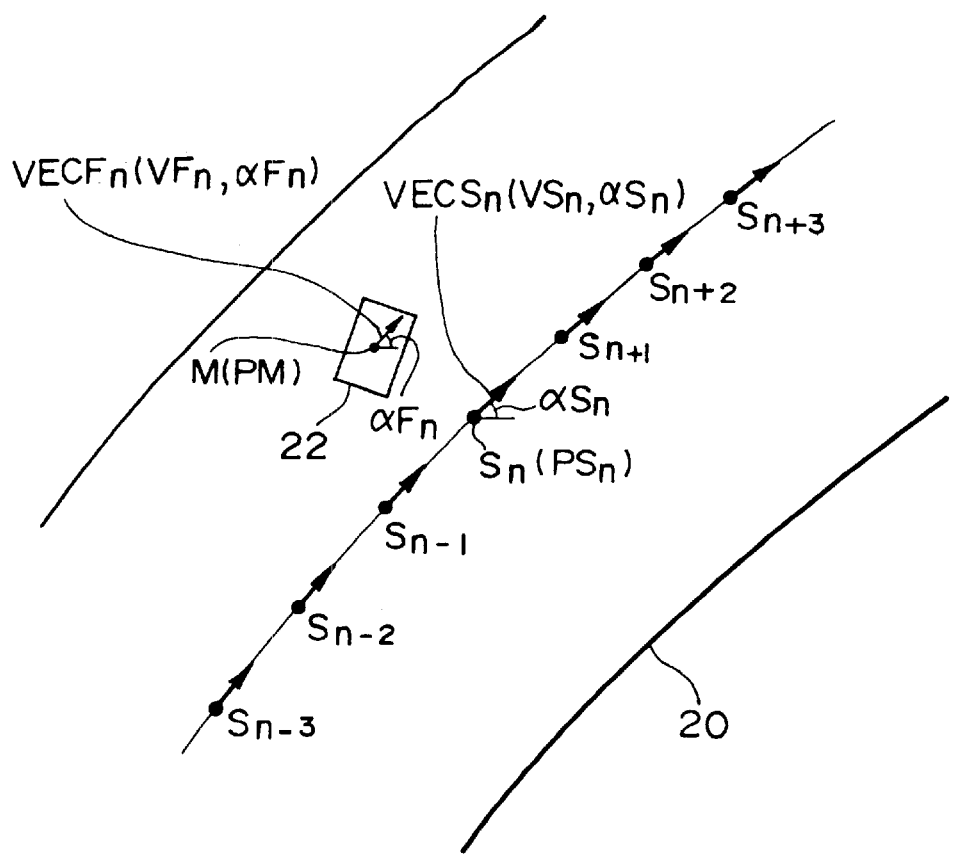
FIGS. 2A and 2B are views illustrating the method of setting flow data.

More specifically, an array of sample points $S_n$ (a first array of sample points) is set along a course 20 in this embodiment, as shown in FIG. 2A. Flow data, which comprises the positions $PS_n$ of the sample points $S_n$ and flow-velocity vectors $VECS_n$ (flow velocity $VS_n$, flow direction $\alpha S_n$) for the sample points $S_n$, is also set for these sample points $S_n$. In this embodiment, a flow-velocity vector $VECF_n$ (flow velocity $VF_n$, flow direction $\alpha F_n$) at a point M at which a moving body 22 such as a boat is positioned is obtained by interpolation, based on this flow data $PS_n$ and $VECS_n$ ($VS_n$, $\alpha S_n$), plus position data for the moving body 22. The moving body 22 is moved on the basis of the thus-obtained flow-velocity vector $VECF_n$. This makes it possible for the flow of the fluid over the course to influence the behavior of the moving body.

Note that the flow-velocity vectors $VECS_n$ for the sample points $S_n$ in FIG. 2A are vectors having magnitude $VS_n$ and direction $\alpha S_n$. Each of these vectors $VECS_n$ points along a line joining the points $S_n$ and $S_{n+1}$. In other words, $\alpha S_n$ indicates the direction linking $S_n$ and $S_{n+1}$. Similarly, the flow-velocity vector $VECF_n$ at the point M is a vector having magnitude $VF_n$ and direction $\alpha F_n$.

Figure 2B:
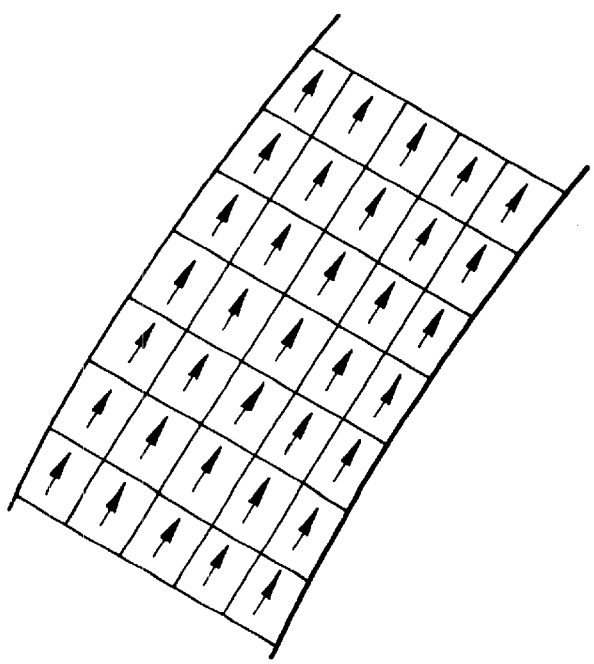

Note also that the method of setting this flow data is not limited to that shown in FIG. 2A, and thus it can be implemented in various other forms. For example, the setting of flow data as shown in FIG. 2A is particularly preferable from the viewpoints of efficient use of storage capacity and reduction in the labor of inputting data, but it is also possible to use the setting method illustrated in FIG. 2B. In other words, mesh points could be allocated to the course, with flow data set for each point of the mesh, as shown in FIG. 2B. The moving body is moved on the basis of the thus-set flow data. With this method, the storage capacity necessary for holding the flow data and the work involved in inputting the data are increased, but it has the advantage of not requiring interpolation calculations.

Figure 3A:
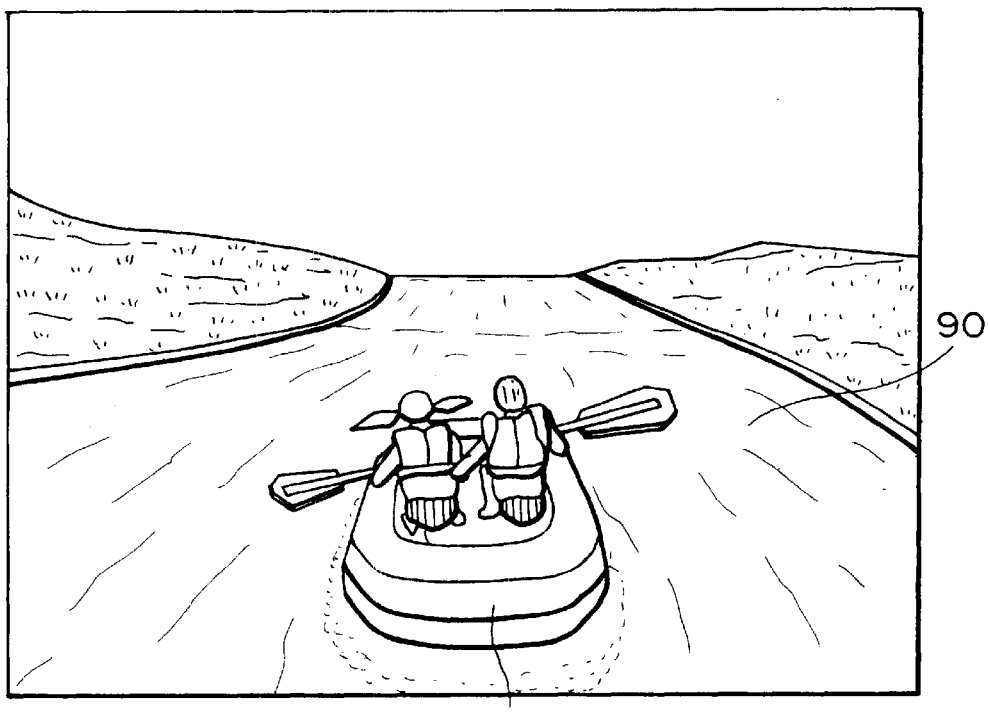
FIGS. 3A and 3B show examples of the images generated by this embodiment.
Figure 3B:
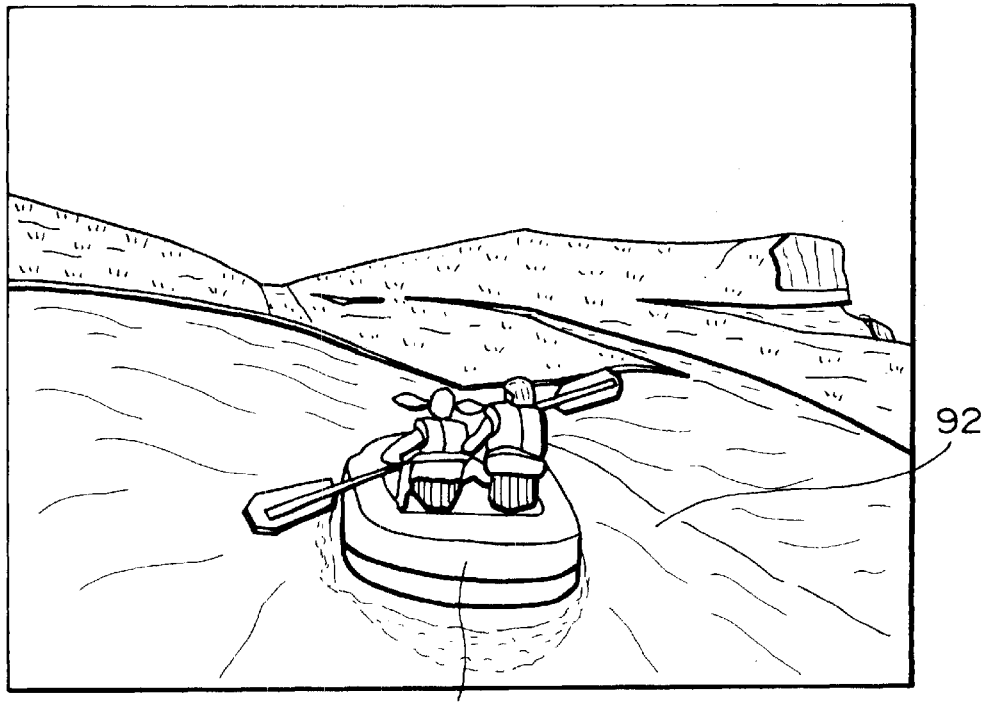

Examples of images created by this embodiment are shown in FIGS. 3A and 3B. FIG. 3A shows a typical image of a gentle flow 90 and FIG. 3B shows a typical image of a fast flow 92.

In the gentle flow 90, the flow velocity is slower. Therefore, the moving body (boat) 22 is drawn slowly along the river, provided the player does not use the paddles (reference number 252 in FIG. 10) of the operating section 10. This makes it possible to give the player a feeling of travelling leisurely along this gentle flow 90.

In the fast flow 92, the flow velocity is faster. Therefore, the moving body 22 is drawn at high speed along the river, even if the player does now use the paddles. This makes it possible to give the player the thrilling feeling of travelling over this fast flow 92.

With this embodiment of the invention, the effects of the flow of a fluid such as water can be reflected in the motion of the moving body. It is therefore possible to make the behavior of the moving body more realistic, and thus increase the realism, the feeling of virtual reality, and the excitement of the game.

The description now turns to an example of the detailed processing performed by this embodiment.

Figure 4:
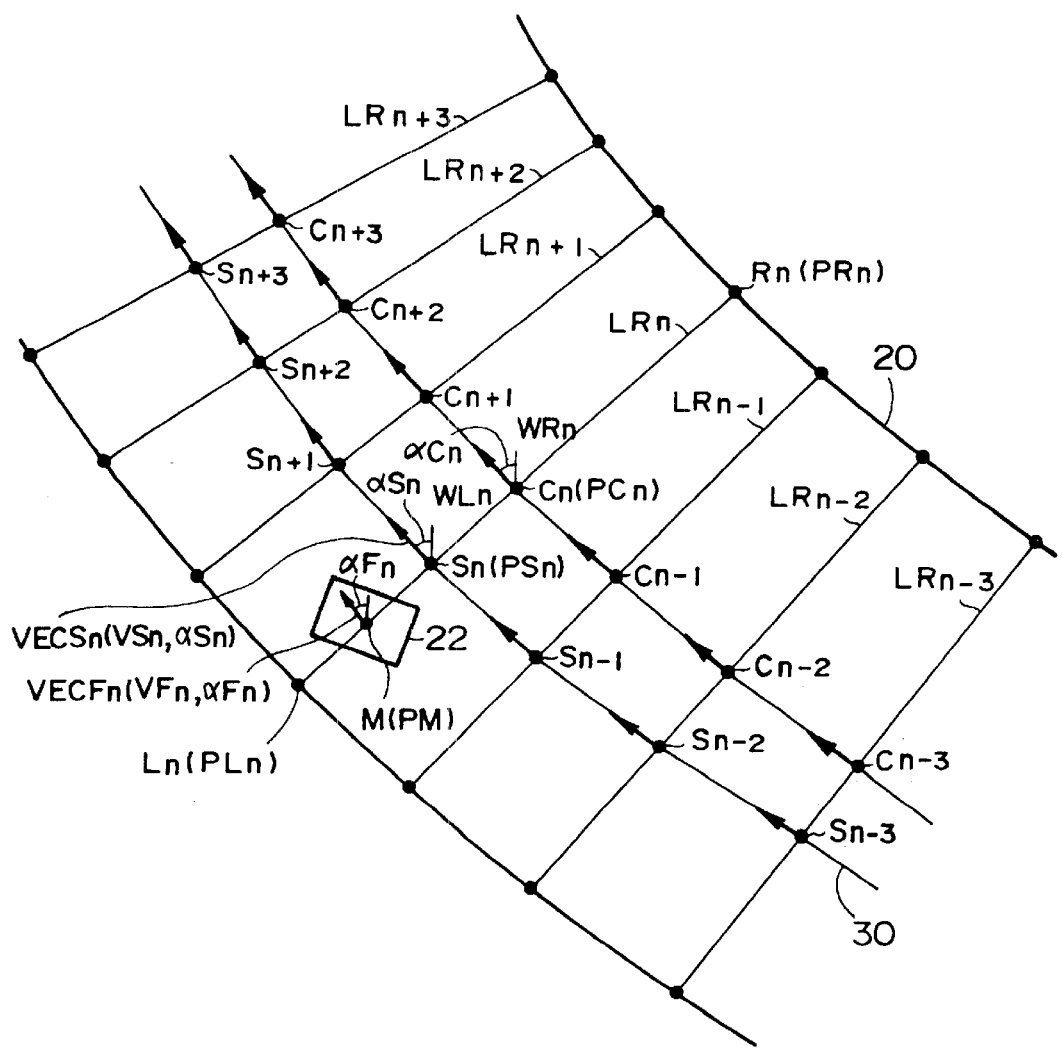
FIG. 4 illustrates a detailed example of this embodiment.

In this detailed example, an array of sample points $S_n$ (first array of sample points) has been set along the course 20, as shown in FIG. 4. Flow data comprising the position $PS_n$ of the sample point $S_n$ and the flow-velocity vector $VECS_n$ (flow velocity $VS_n$, flow direction $\alpha S_n$) at $S_n$ is set for each sample point $S_n$.

In addition, an array of sample points $C_n$ (second array of sample points) and arrays of sample points $L_n$ and $R_n$ are also set along this course 20. Course data comprising the position $PC_n$ of the sample point $C_n$, the course direction $\alpha C_n$, the width $WL_n$ towards the left side of the course from the sample point $C_n$, and the width $WR_n$ towards the right side of the course from the sample point $C_n$ is set for each sample point $C_n$. Left-edge data comprising the position $PL_n$ of the left edge of the course is set for each sample point $L_n$ and right-edge data comprising the position $PR_n$ of the right edge of the course is set for each sample point $R_n$. Note that in this embodiment, each of the arrays of sample points $C_n$, $S_n$, $L_n$, and $R_n$ is a linear array of points.

The structure of this course data, flow data, left-edge data, and right-edge data is illustrated in FIGS. 5A to 5D. As shown in these figures, this data can be read out by using a block number n of the course as an argument. If, for example, the block number n is specified as 2, course data ($PC_2$, $\alpha C_2$, $WL_2$, $WR_2$), flow data ($PS_2$, $VS_2$, $\alpha S_2$), left-edge data ($PL_2$), and right-edge data ($PR_2$) can be read out for this block number 2.

In the embodiment configured in this manner, the flow data is set at sample points $S_n$, in a one-to-one correspondence with the course data set for the sample points $C_n$. This is intended to simplify the processing.

Note that the description below assumes that the moving body 22 is positioned on a line $LR_n$ that links the left-edge point $L_n$ and the right-edge point $R_n$. In practice, it is possible to consider that the moving body 22 is not positioned exactly on the line $LR_n$ (for example, it may be positioned within a region between the lines $LR_n$ and $LR_{n+1}$). However, if the spacing between the sample points is sufficiently small, this does not cause a significant problem, even if the position of the moving body 22 is only approximately on the line $LR_n$.

When the moving body 22 is positioned on the line $LR_n$, the corresponding course data ($PC_n$, $\alpha C_n$, $WL_n$, $WR_n$), flow data ($PS_n$, $VS_n$, $\alpha S_n$), left-edge data ($PL_n$), and right-edge data ($PR_n$) is read out on the basis of the block number n. In this embodiment, the flow-velocity vector $VECF_n$ (flow velocity $VF_n$, flow direction $\alpha F_n$) at the point M at which is moving body 22 is positioned is obtained from the read-out data.

Figure 6A:
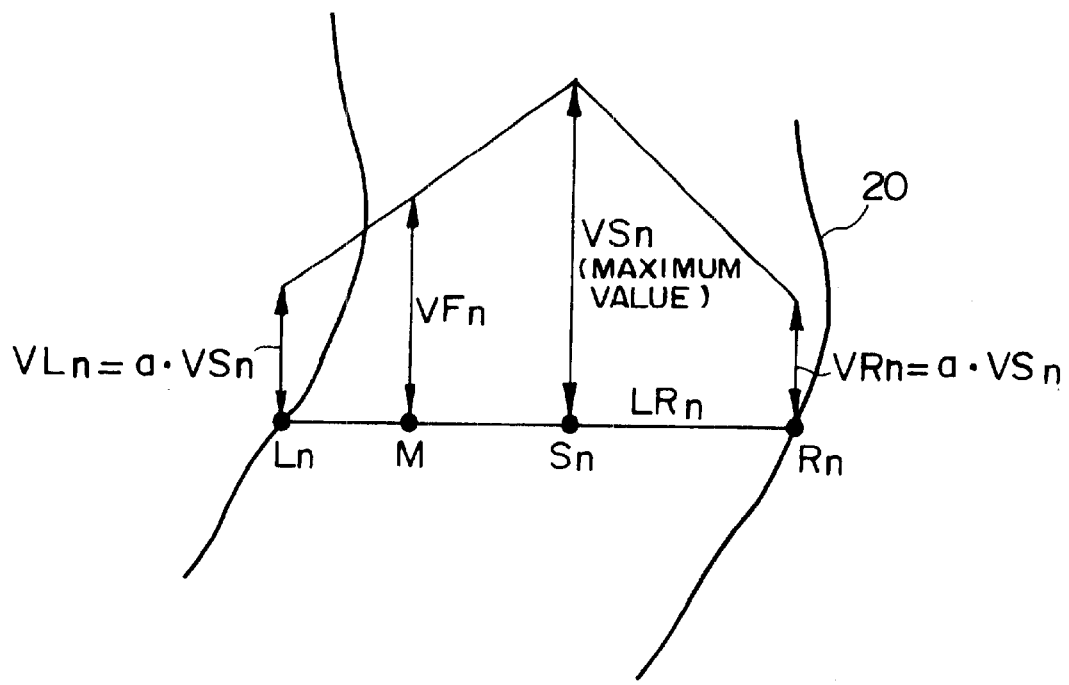
FIGS. 6A and 6B are views illustrating the setting of flow velocities at the left and right edges of the course and the method used for interpolating the flow velocity.

In this case, the flow velocity $VS_n$ at the sample point $S_n$ in this embodiment is the maximum flow velocity within the course cross-section (on the line $LR_n$), as shown in FIG. 6A. In other words, a line 30 linking the sample points $S_n$ in this embodiment (see FIG. 4) is a line that connects the points at which the flow velocity is a maximum. A particular feature of this embodiment is the way in which the line 30 tends towards the left when the course 20 curves to the right and tends towards the right when the course 20 curves to the left. This makes it possible to represent the flow of water more realistically.

In this embodiment, the flow velocity $VF_n$ at the point M is then obtained by interpolation between the flow velocity $VS_n$ (a first flow velocity) at the sample point $S_n$ and either the flow velocity $VL_n$ (a second flow velocity) at the left edge $L_n$ of the course or the flow velocity $VR_n$ (a third flow velocity) at the right edge $R_n$ of the course.

The flow velocities $VL_n$ and $VR_n$ at the left edge $L_n$ and right edge $R_n$ of the course are obtained from Equation 1 below.

$$VL_n = VR_n = a \cdot VS_n \tag{1}$$

where a is a constant, $a \leq 1$, and "·" indicates multiplication.

Figure 6B:
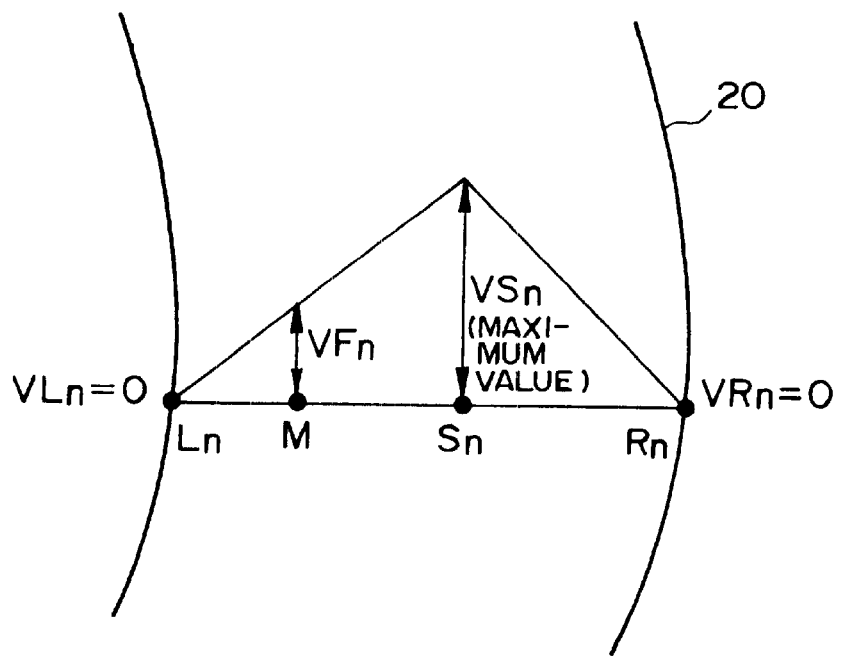

Note that $VL_n$ and $VR_n$ could be constant values independent of the magnitudes of $VS_n$. Note also that both $VL_n$ and $VR_n$ could be zero, as shown in FIG. 6B.

In a real river, the flow velocities at the left and right edges of the river can be considered to be substantially zero. This means that it is preferable to set both $VL_n$ and $VR_n$ to zero as shown in FIG. 6B, to ensure a faithful representation of the flow of water in a real river.

However, if both $VL_n$ and $VR_n$ are set to zero, a problem arises in that the game balance is upset. In other words, if $VL_n$ and $VR_n$ are set to zero, the flow velocity $VF_n$ in the vicinity of the left edge $L_n$ or right edge $R_n$ of the course will be too slow, which will cause the moving body 22 to come to a halt. This would feel unnatural to the player.

If the flow velocities $VL_n$ and $VR_n$ at the left edge $L_n$ and right edge $R_n$ of the course are set greater than zero as shown in FIG. 6A, on the other hand, this will prevent the situation in which the flow velocity $VF_n$ in the vicinity of the left edge $L_n$ or right edge $R_n$ is too slow. This is because the value of the flow velocity $VF_n$ will increase by the magnitudes of $VL_n$ and $VR_n$. Setting $VL_n$ and $VR_n$ to greater than zero is contrary to the natural flow of a river, but it is still preferable to set $VL_n$ and $VR_n$ to greater than zero from the viewpoint of improving the game balance.

Figure 7A:
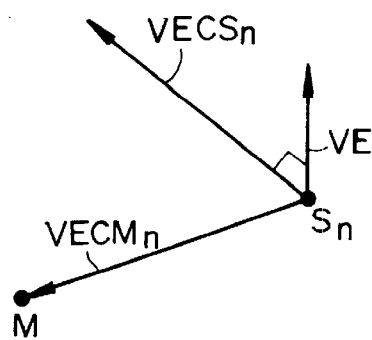
FIGS. 7A, 7B, and 7C are views illustrating the process of determining whether the moving body is positioned to the left or the right of the course, then interpolating the flow velocity.
Figure 7B:
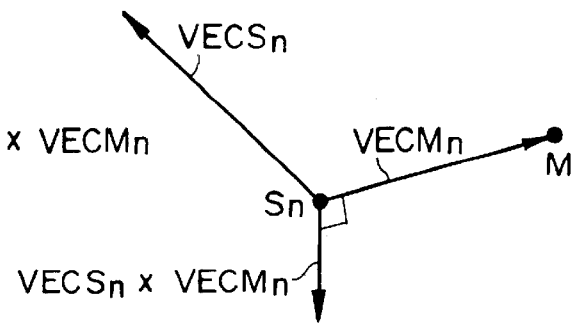

To perform the interpolation between $VS_n$ and either $VL_n$ or $VR_n$, it is necessary to determine whether the moving body 22 (point M) is on the left side or the right side of the line 30 of sample points $S_n$. Therefore, the outer product $VECS_n \times VECM_n$ of the flow-velocity vector $VECS_n$ ($VECS_{xn}$, $VECS_{yn}$, $VECS_{zn}$) at each sample point $S_n$ and the vector $VECM_n$ ($VECM_{xn}$, $VECM_{yn}$, $VECM_{zn}$)=($PM_x - PS_{xn}$, $PM_y - PS_{yn}$, $PM_z - PS_{zn}$) pointing from the sample point $S_n$ to the point M is obtained by this embodiment, as shown in FIGS. 7A and 7B.

If the vectors $VECS_n$ and $VECM_n$ are considered to lie within the X-Z plane, the Y (vertical) component alone of the outer product $VECS_n \times VECM_n$ is taken, and that Y component is derived as shown in Equation 2 below.

$$VSM_y = VECS_{zn} \cdot VECM_{xn} - VECS_{xn} \cdot VECM_{zn} \tag{2}$$

It is possible to determine whether the moving body 22 (point M) is on the left side or the right side of the line 30 of sample points $S_n$ by checking the sign of $VSM_y$. For example, FIG. 7A shows a determination on the left side and FIG. 7B shows a determination on the right side.

Figure 7C:
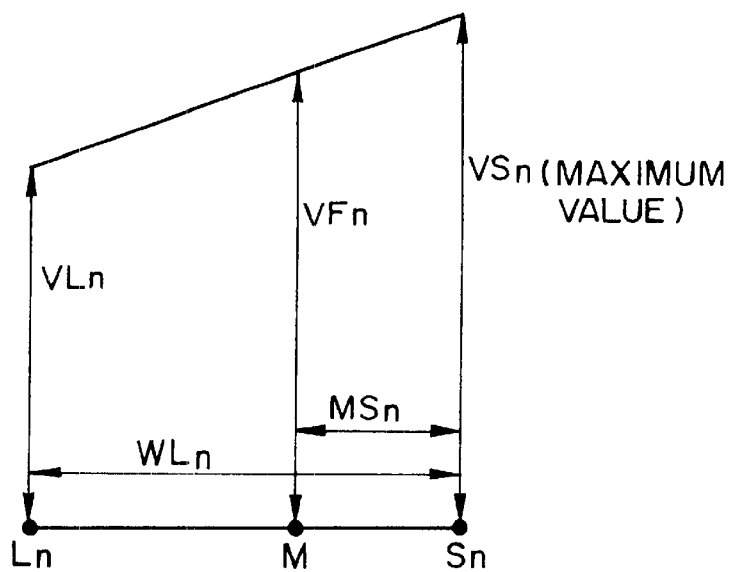

If the moving body 22 is determined to be on the left side of the line 30, the interpolation is performed as shown in FIG. 7C. In other words, if the distance between the point M and the sample point $S_n$ is $MS_n$, the flow velocity $VF_n$ at the point M at which the moving body 22 is positioned can be obtained from Equation 3 below.

$$VF_n = \{VL_n \cdot MS_n + VS_n \cdot (WL_n - MS_n)\}/WL_n \tag{3}$$

A similar method can be used for the calculation if the moving body 22 is determined to be on the right side of the line 30.

Note that the flow direction $\alpha F_n$ is constant to be the same direction as the flow direction $\alpha S_n$ at the sample point $S_n$ independent of the position of the moving body 22 (point M) on the line $LR_n$ in this embodiment.

With this embodiment, the moving body is moved in accordance with the flow-velocity vector $VECF_n$ ($VF_n$, $\alpha F_n$) obtained as described above and manipulation data that is input by the operating section 10. Assume that the position of the moving body 22 in a (k−1)th frame is $PM_{k-1}$, the velocity thereof is $VM_{k-1}$, and the time taken by each frame is $\Delta t$, by way of example. Thus the position $PM_k$ of the moving body 22 in the kth frame can be obtained from Equation 4 below.

$$PM_k = PM_{k-1} + VM_{k-1} \cdot \Delta t \tag{4}$$

In the prior art, the velocity $VM_{k-1}$ in Equation 4 has been determined only by data such as manipulation data that has input by the player; the flow-velocity vector $VECF_n$ has not been considered at all. In this embodiment of the invention, the flow-velocity vector $VECF_n$ is also considered in the determination of $VM_{k-1}$; not just the manipulation data. This makes it possible for the flow of the fluid over the course to influence the behavior of the moving body 22.

Note that not only the position of the moving body 22 is obtained based on this flow-velocity vector $VECF_n$; the direction of the moving body 22 could also be obtained therefrom.

Figure 8:
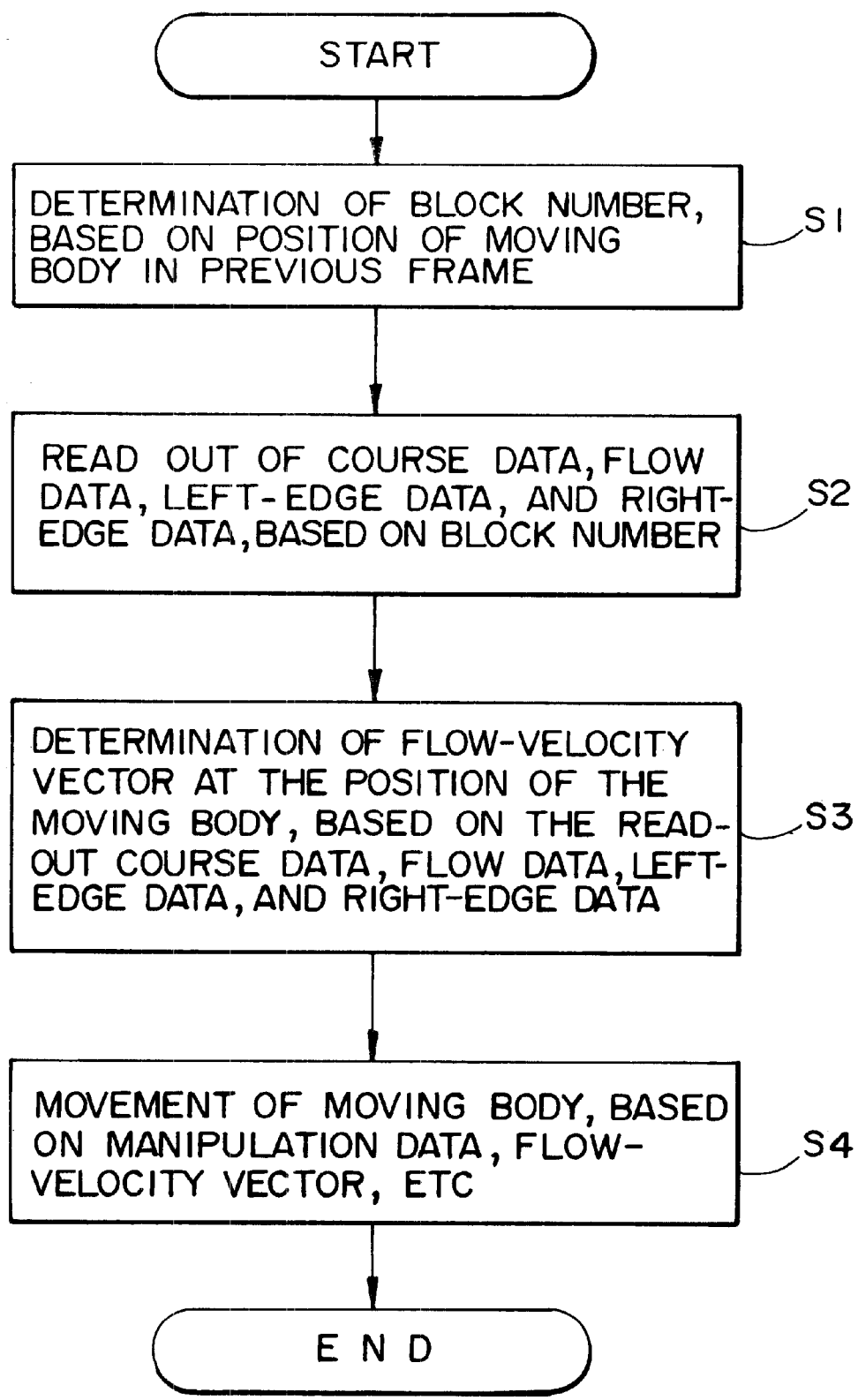
FIG. 8 is a flowchart illustrating a detailed example of the processing of this embodiment.

A detailed example of the operation of this embodiment will now be described, using the flowchart shown in FIG. 8.

First of all, the block number of the course is specified, based on the position of the moving body 22 in the previous frame (or two or more frames previously) (step S1). If, for example, the moving body 22 is positioned on the line $LR_n$ in FIG. 4 (or the region between $LR_n$ and $LR_{n+1}$), the block number is n; if it is on the line $LR_{n+1}$ (or the region between $LR_{n+1}$ and $LR_{n+2}$), the block number is n+1.

Based on the specified block number, the course data $PC_n$, $\alpha C_n$, $WL_n$, and $WR_n$; flow data $PS_n$, $VS_n$, and $\alpha S_n$; left-edge data $PL_n$; and right-edge data $PR_n$ shown in FIGS. 5A to 5D is then read out (step S2).

The flow-velocity vector $VECF_n$ at the position of the moving body 22 is obtained in accordance with Equations 1, 2, and 3, for example, based on the read-out course data, flow data, left-edge data, and right-edge data (step S3).

Calculations for causing the moving body 22 to move are then performed, in accordance with Equation 4, for example, based on data such as manipulation data that is input by the player and the flow-velocity vector $VECF_n$ that was obtained by step S3 (step S4).

Figure 9:
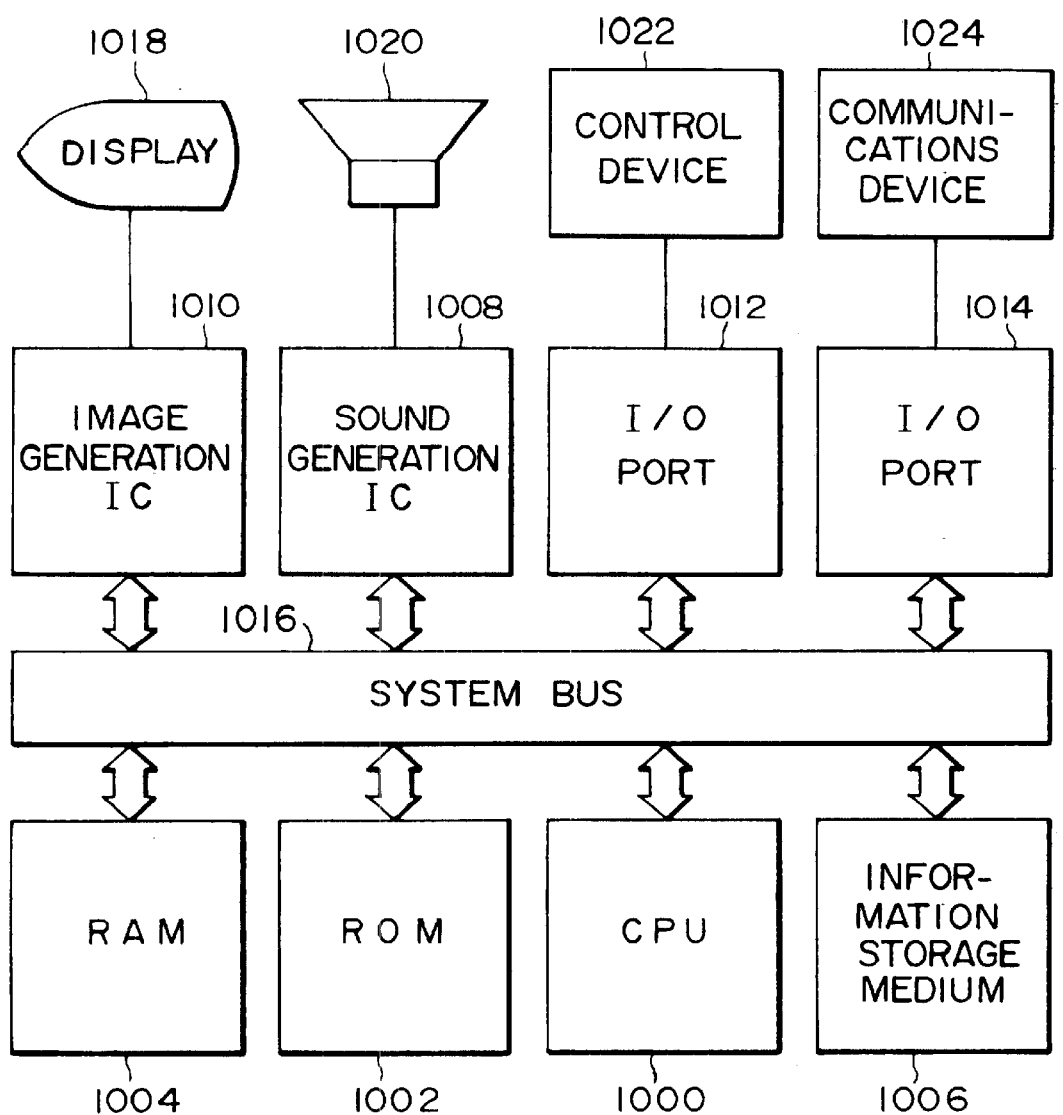
FIG. 9 shows an example of a hardware configuration capable of implementing this embodiment.

The description now turns to an example of hardware that can implement this embodiment, with reference to FIG. 9. In the apparatus shown in this figure, a CPU 1000, ROM 1002, RAM 1004, an information storage medium 1006, a sound generation IC 1008, an image generation IC 1010, and I/O ports 1012 and 1014 are connected together by a system bus 1016 so that data can be mutually transferred therebetween. A display 1018 is connected to the image generation IC 1010, a speaker 1020 is connected to the sound generation IC 1008, a control device 1022 is connected to the I/O port 1012, and a communications device 1024 is connected to the I/O port 1014.

Image data and sound data or the like for representing a game program and display objects is mainly stored in the information storage medium 1006. Means such as a CD-ROM, game cassette, or DVD could be used as an information storage medium for storing a game program for a domestic game machine, for example. Alternatively, memory such as ROM could be used for an arcade game machine, in which case the information storage medium 1006 is the ROM 1002.

The control device 1022 is equivalent to a game controller or operating panel and it is used as a device for inputting into the main unit of the device the results of decisions made by the player as the game progresses.

The CPU 1000 controls the entire device and processes data in accordance with a game program stored in the information storage medium 1006, a system program stored in the ROM 1002 (including initialization information for the entire device), and signals input through the control device 1022. The RAM 1004 is a storage means that is used as a work space for the CPU 1000, and specific details from the information storage medium 1006 or the ROM 1002, or the results of calculations by the CPU 1000, are stored therein. A data having the logical structure shown in FIGS. 5A to 5D is built into this RAM or information storage medium.

The provision of the sound generation IC 1008 and the image generation IC 1010 in this type of device makes it possible to output game sounds and game images as required. The sound generation IC 1008 is an integrated circuit device that generates game sounds such as sound effects and background music, based on information stored in the information storage medium 1006 or the ROM 1002, and the thus generated game sounds are output by the speaker 1020. The image generation IC 1010 is an integrated circuit device that generates pixel information for output to the display 1018, based on image information that is sent from components such as the RAM 1004, the ROM 1002, and the information storage medium 1006. Note that a device called a head-mounted display (HMD) could be used as the display 1018.

The communications device 1024 transfers various types of information used within the game machine to and from external devices, and it is used to send and receive given information in accordance with a game program when connected to another game machine, or send and receive information such as a game program through a communications line. The processing described with reference to FIGS. 1 to 7C is implemented by components such as the information storage medium 1006 that contains a game program for performing processing such as that shown in the flowchart of FIG. 8, the CPU 1000 that operates in accordance with the game program, and the image generation IC 1010 and sound generation IC 1008. Note that the processing performed by the image generation IC 1010 and the sound generation IC 1008 could be performed in a software manner by means such as the CPU 100 or an all-purpose DSP.

Figure 10:
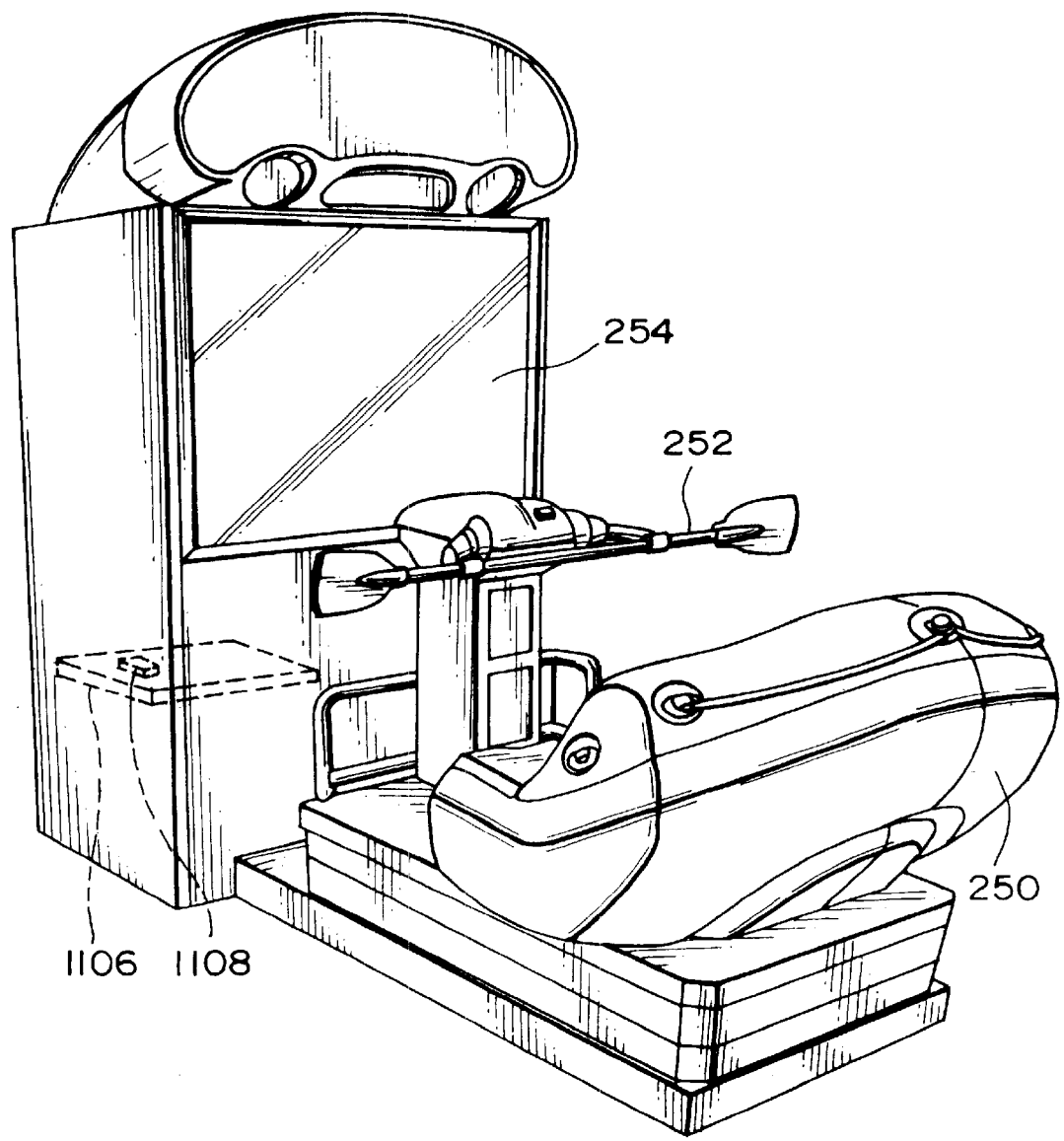
FIG. 10 shows an example of an arcade game machine to which this embodiment is applied.

An example of this embodiment applied to an arcade game machine is shown in FIG. 10. A player sits on a seat 250 and operates paddles 252 to cause a boat (moving body) that is shown on a display section 254 to move within an object space. In this case, the paddles 252 correspond to the operating section 10 of FIG. 1. Note that, when two players are playing this game, a first player holds the left side of the paddles 252 and a second player holds the right side of the paddles 252, to operate the 10 paddles 252 in cooperation with each other. Components such as a CPU, an image generation IC, and a sound generation IC are mounted on a system board 1106 built into the device. Information is stored in memory 1108, which is the information storage medium 1006 on the system board 1106. This information comprises information for causing the moving body to move along the course, based on manipulation data that is input from a manipulation means and flow data for a fluid that is set along a course within this object space; information for generating an image as seen from a given viewpoint within the object space, which is an image that comprises an image of the course; and information for causing the moving body to move in accordance with a flow-velocity vector at the position of the moving body which is obtained by interpolation, based on flow data that is set for the first array of sample points on the course and position data for the moving body. This information is hereinafter called stored information. This stored information comprises at least one type of information, such as program coding for performing the above described processing, image information, sound information, shape information for display objects, table data, list data, or player information.

Figure 11A:
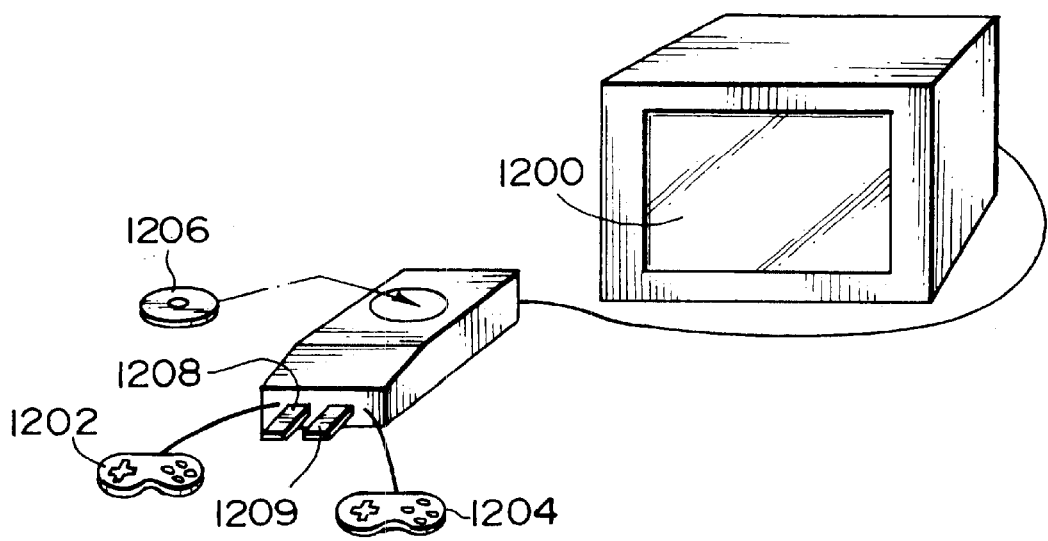
FIGS. 11A and 11B show examples of different types of apparatus to which this embodiment is applied.

An example of this embodiment applied to a domestic game machine is shown in FIG. 11A. Players enjoy the game by manipulating game controllers 1202 and 1204 while viewing a game image shown on a display 1200. In this case, the above described stored information is stored in a CD-ROM 1206 or IC cards 1208 and 1209 that are information storage media that can be freely inserted into and removed from the main unit.

Figure 11B:
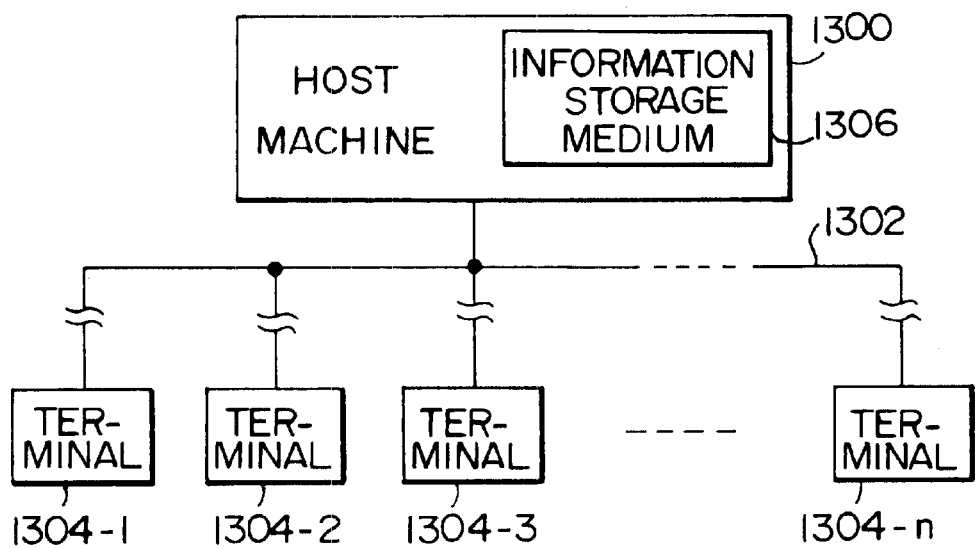

An example of this embodiment applied to a game machine is shown in FIG. 11B, where the game machine comprises a host machine 1300 and terminals 1304-1 to 1304-n connected to the host machine 1300 by communications lines 1302. In this case, the above described stored information is stored in an information storage medium 1306 such as a magnetic disk, magnetic tape, or memory that can be controlled by the host machine 1300. If each of terminals 1304-1 to 1304-n has a CPU, an image generation IC, and a sound generation IC to generate game images and sounds in a stand-alone manner, data such as a game program for generating game images and sounds is transferred to the terminals 1304-1 to 1304-n from the host machine 1300. On the other hand, if they cannot be generated in a stand-alone manner, the host machine 1300 creates the game images and sounds then transfers them to the terminals 1304-1 to 1304-n for output by those terminals.

Note that this invention is not limited to the above described embodiments and it can be implemented in various other ways.

For example, the method of setting the flow data that was described in the embodiment above is particularly preferable, but the present invention is not limited thereto.

In addition, the processing for obtaining the flow data at the position of the moving body by interpolation, based on flow data and position data for the moving body, that was described in the embodiment above is also particularly preferable, but the present invention is not limited thereto. For example, the array of sample points for which the flow data is set could be two or more such arrays. Similarly, the interpolation is not necessary linear; it could equally well be done by using an M-dimensional curve (such as a quadratic or cubic curve), or a curve that cannot be expressed by linear equations (such as a sine curve, cosine curve, or Bezier curve).

The formats of the course data and flow data are also not I limited to those described with reference to FIGS. 4, 5A, and 5B, and thus they can be implemented in various other forms.

Furthermore, the game to which this invention is applied is not limited to a game involving rafting down a river, as described in the above embodiment, This invention is also not limited to domestic and arcade game machines; it can also be applied to various other game machines such as simulators, large-scale attractions in which many players can participate, personal computers, multimedia terminals, and system boards that generate game images.

What is claimed is:

1. An image generation apparatus for generating an image at a given viewpoint within an object space, said image generation apparatus comprising:

means for causing a moving body to move over a course within said object space, based on manipulation data that is input from a manipulation means and flow data for a fluid that is set along said course; and means for generating an image as seen from a given viewpoint of the moving body within said object space, which is an image comprising an image of said course, the given viewpoint of the moving body within said object space changing based on the movement of the moving body that moves based on the manipulation data that is input from said manipulation means and the flow data for the fluid that is set along said course, wherein a flow-velocity vector at the position of said moving body is obtained by interpolation based on flow data that is set for a first array of sample points on said course and position data for said moving body, said moving body being moved in accordance with the flow-velocity vector.

2. The image generation apparatus as defined in claim 1, wherein said flow data comprises a first flow velocity that is the maximum flow velocity within a course cross-section; and wherein interpolation on a left side of a line linking said first array of sample points is based on said first flow velocity and a second flow velocity at a left edge of said course, whereas interpolation on a right side of said line linking said first array of sample points is based on said first flow velocity and a third flow velocity at a right edge of said course.

3. The image generation apparatus as defined in claim 2, wherein said second and third flow velocities are each greater than zero.

4. The image generation apparatus as defined in claim 2, wherein said flow data is set for said first array of sample points to be in a one-to-one correspondence with course data that is set for a second array of sample points on said course.

5. The image generation apparatus as defined in claim 4, wherein said flow data is set for said first array of sample points to be in a one-to-one correspondence with course data that is set for a second array of sample points on said course.

6. The image generation apparatus as defined in claim 1, wherein said flow data is set for said first array of sample points to be in a one-to-one correspondence with course data that is set for a second array of sample points on said course.

7. An information storage medium used in an image generation apparatus for generating an image at a given viewpoint within an object space, said information storage medium comprising:

information for causing a moving body to move along a course within said object space, based on manipulation data that is input from a manipulation means and flow data for a fluid that is set along said course; and information for generating an image as seen from a given viewpoint of the moving body within said object space, which is an image comprising an image of said course, the given viewpoint of the moving body within said object space changing based on the movement of the moving body that moves based on the manipulation data that is input from said manipulation means and the flow data for the fluid that is set along said course, wherein a flow-velocity vector at the position of said moving body is obtained by interpolation based on flow data that is set for a first array of sample points on said course and position data for said moving body, said moving body being moved in accordance with the flow-velocity vector.

8. The information storage medium as defined in claim 7, wherein said flow data comprises a first flow velocity that is the maximum flow velocity within a course cross-section; and wherein interpolation on a left side of a line linking said first array of sample points is based on said first flow velocity and a second flow velocity at a left edge of said course, whereas interpolation on a right side of said line linking said first array of sample points is based on said first flow velocity and a third flow velocity at a right edge of said course.

9. The information storage medium as defined in claim 8, wherein said second and third flow velocities are each greater than zero.

10. The information storage medium as defined in claim 8, wherein said flow data is set for said first array of sample points to be in a one-to-one correspondence with course data that is set for a second array of sample points on said course.

11. The information storage medium as defined in claim 9,
wherein said flow data is set for said first array of sample points to be in a one-to-one correspondence with course data that is set for a second array of sample points on said course.

12. The information storage medium as defined in claim 8,
wherein said flow data is set for said first array of sample points to be in a one-to-one correspondence with course data that is set for a second array of sample points on said course.

13. An image generation apparatus for generating an image at a given viewpoint within an object space, said image generation apparatus comprising:
means for causing a moving body to move over a course within said object space, based on manipulation data that is input from a manipulation means and flow data for a fluid that is set along said course; and
means for generating an image as seen from a given viewpoint of the moving body within said object space, which is an image comprising an image of said course, the given viewpoint of the moving body within said object space changing based on the movement of the moving body that moves based on the manipulation data that is input from said manipulation means and the flow data for the fluid that is set along said course,
wherein mesh points are allocated to said course, said flow data is set for each point of the mesh, and said moving body is moved based on the flow data.

14. The image generation apparatus as defined in claim 13,
wherein a second flow velocity at a left edge of said course and a third flow velocity at a right edge of said course are set smaller than a first flow velocity that is the maximum flow velocity within a course cross-section.

15. The image generation apparatus as defined in claim 14,
wherein said second and third flow velocities are each greater than zero.

16. An image generation apparatus for generating an image at a given viewpoint within an object space, said image generation apparatus comprising:
means for causing a moving body to move over a course within said object space, based on manipulation data that is input from a manipulation means and flow data for a fluid that is set along said course; and
means for generating an image as seen from a given viewpoint of the moving body within said object space, which is an image comprising an image of said course, the given viewpoint of the moving body within said object space changing based on the movement of the moving body that moves based on the manipulation data that is input from said manipulation means and the flow data for the fluid that is set along said course,
wherein a second flow velocity at a left edge of said course and a third flow velocity at a right edge of said course are set smaller than a first flow velocity that is the maximum flow velocity within a course cross-section; and
wherein said second and third flow velocities are each greater than zero.

17. An information storage medium used in an image generation apparatus for generating an image at a given viewpoint within an object space, said information storage medium comprising:
information for causing a moving body to move over a course within said object space, based on manipulation data that is input from a manipulation means and flow data for a fluid that is set along said course; and
information for generating an image as seen from a given viewpoint of the moving body within said object space, which is an image comprising an image of said course, the given viewpoint of the moving body within said object space changing based on the movement of the moving body that moves based on the manipulation data that is input from said manipulation means and the flow data for the fluid that is set along said course,
wherein mesh points are allocated to said course, said flow data is set for each point of the mesh, and said moving body is moved based on the flow data.

18. The information storage medium in claim 17,
wherein a second flow velocity at a left edge of said course and a third flow velocity at a right edge of said course are set smaller than a first flow velocity that is the maximum flow velocity within a course cross-section.

19. The information storage medium in claim 18,
wherein said second and third flow velocities are each greater than zero.

20. An information storage medium used in an image generation apparatus for generating an image at a given viewpoint within an object space, said information storage medium comprising:
information for causing a moving body to move over a course within said object space, based on manipulation data that is input from a manipulation means and flow data for a fluid that is set along said course; and
information for generating an image as seen from a given viewpoint of the moving body within said object space, which is an image comprising an image of said course, the given viewpoint of the moving body within said object space changing based on the movement of the moving body that moves based on the manipulation data that is input from said manipulation means and the flow data for the fluid that is set along said course,
wherein a second flow velocity at a left edge of said course and a third flow velocity at a right edge of said course are set smaller than a first flow velocity that is the maximum flow velocity within a course cross-section; and
wherein said second and third flow velocities are each greater than zero.

* * * * *